J. R. BRICE.
NUT LOCKING DEVICE.
APPLICATION FILED APR. 29, 1916.
1,197,257.
Patented Sept. 5, 1916.
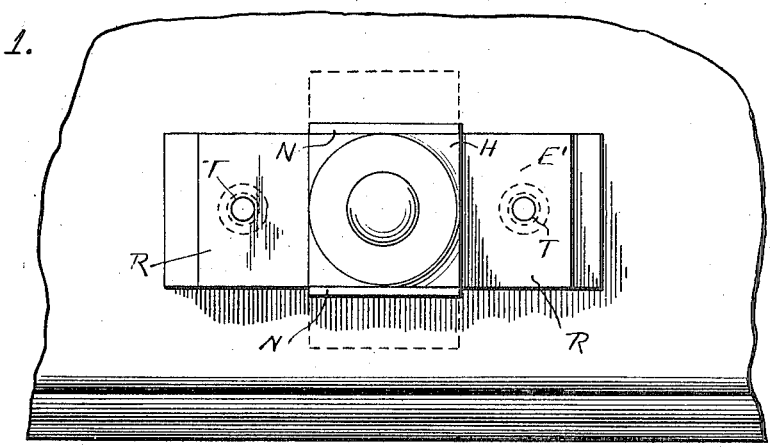
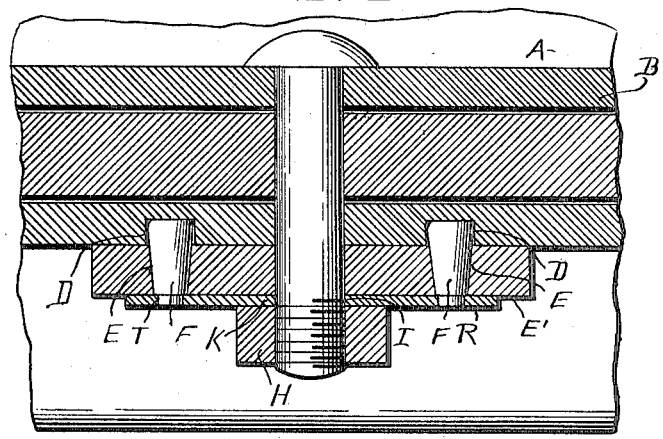
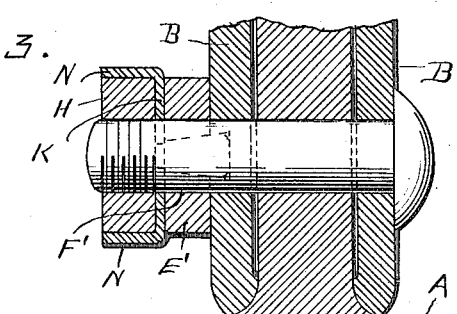

UNITED STATES PATENT OFFICE.

JOSEPH R. BRICE, OF IDABEL, OKLAHOMA.

NUT-LOCKING DEVICE.

1,197,257.  Specification of Letters Patent. Patented Sept. 5, 1916.

Application filed April 29, 1916. Serial No. 94,391.

*To all whom it may concern:*

Be it known that I, JOSEPH R. BRICE, a citizen of the United States, residing at Idabel, in the county of McCurtain and State of Oklahoma, have invented certain new and useful Improvements in Nut-Locking Devices; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in nut locking devices, especially adapted for use upon fish plates for connecting rails together upon railways and consists of a simple and efficient device of this nature having various details of construction, combinations and arrangements of parts which will be hereinafter fully described, shown in the accompanying drawings and then specifically defined in the appended claims.

My invention is illustrated in the accompanying drawings, in which:—

Figure 1 is an elevation showing the application of the invention to a fish plate. Fig. 2 is a longitudinal central sectional view on line 2—2 of Fig. 1. Fig. 3 is a vertical transverse section on line 3—3 of Fig. 1.

Reference now being had to the details of the drawings by letter, A designates a rail and B fish plates which are apertured for the reception of the bolt C. One of said fish plates has indentures, designated by letter D, in the outer face thereof and which are adapted to receive the inner ends of the pins F, portions of which latter are slightly tapering, as shown in Fig. 2 of the drawings, and which are adapted to engage holes E formed in the block E'. Said block E' is also provided with a central aperture F' for the reception of the bolt, which bolt and pins are designed to project through the plate. The bolt is provided with the usual nut H, and K designates a washer plate having a central opening I for the reception of the bolt and oppositely disposed wings N which, after the washer is applied to the bolt, are adapted to be bent up at right angles to the face of the plate and engage the opposite edges of the nut. Other wings, designated by letter R, upon the plate project in the opposite direction from the wings above referred to and are apertured as at T for the reception of the contracted projecting ends of said pins.

When the parts are adjusted in the manner shown in the drawings, it will be noted that the pins will effectually prevent the washer from turning while the wings upon the latter will securely hold the nut from loosening. When it is desired to remove the washer, the wings which engage the opposite edges of the nut may be bent so as to clear the same and the washer will then be removed without interference from the pin.

What I claim to be new is:—

1. A nut locking device comprising a fish plate apertured for a bolt and provided with indentures in one face thereof, pins engaging said indentures, a block having an aperture for the reception of the bolt and other apertures for the reception of said pins, a washer, a bolt receiving aperture provided with oppositely disposed wings designed to be bent against the edges of a nut, and other wings at right angles to the first referred to wings and apertured for the reception of said pins.

2. A nut locking device comprising a fish plate apertured for a bolt and provided with indentures in one face thereof, pins engaging said indentures, and having slightly tapering shank portions with contracted ends, a block apertured to receive said bolt and provided with other apertures which are tapering to conform to and receive said pins, a washer apertured to receive the bolt and provided with wings for engagement with the edges of the nut, and other wings which are apertured for the reception of the contracted ends of said pins.

In testimony whereof I hereunto affix my signature in presence of two witnesses.

JOSEPH R. BRICE.

Witnesses:
 HARVEY S. ROWLAND,
 D. G. FLENNIKEN.

Copies of this patent may be obtained for five cents each, by addressing the "Commissioner of Patents, Washington, D. C."